(No Model.) 4 Sheets—Sheet 2.
J. J. CLICK.
REVERSIBLE SPRING MOTOR.
No. 581,103. Patented Apr. 20, 1897.
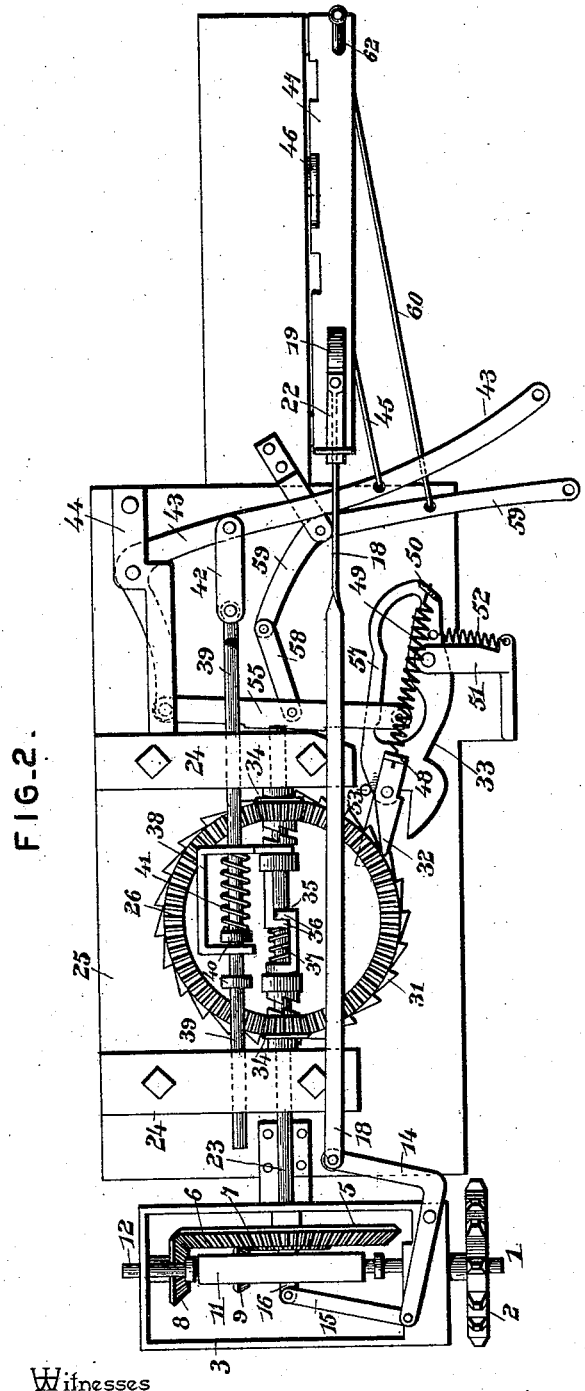
Witnesses
Jas. K. McCathran
R. M. Smith
Inventor
John J. Click
By his Attorneys,
C. A. Snow & Co.

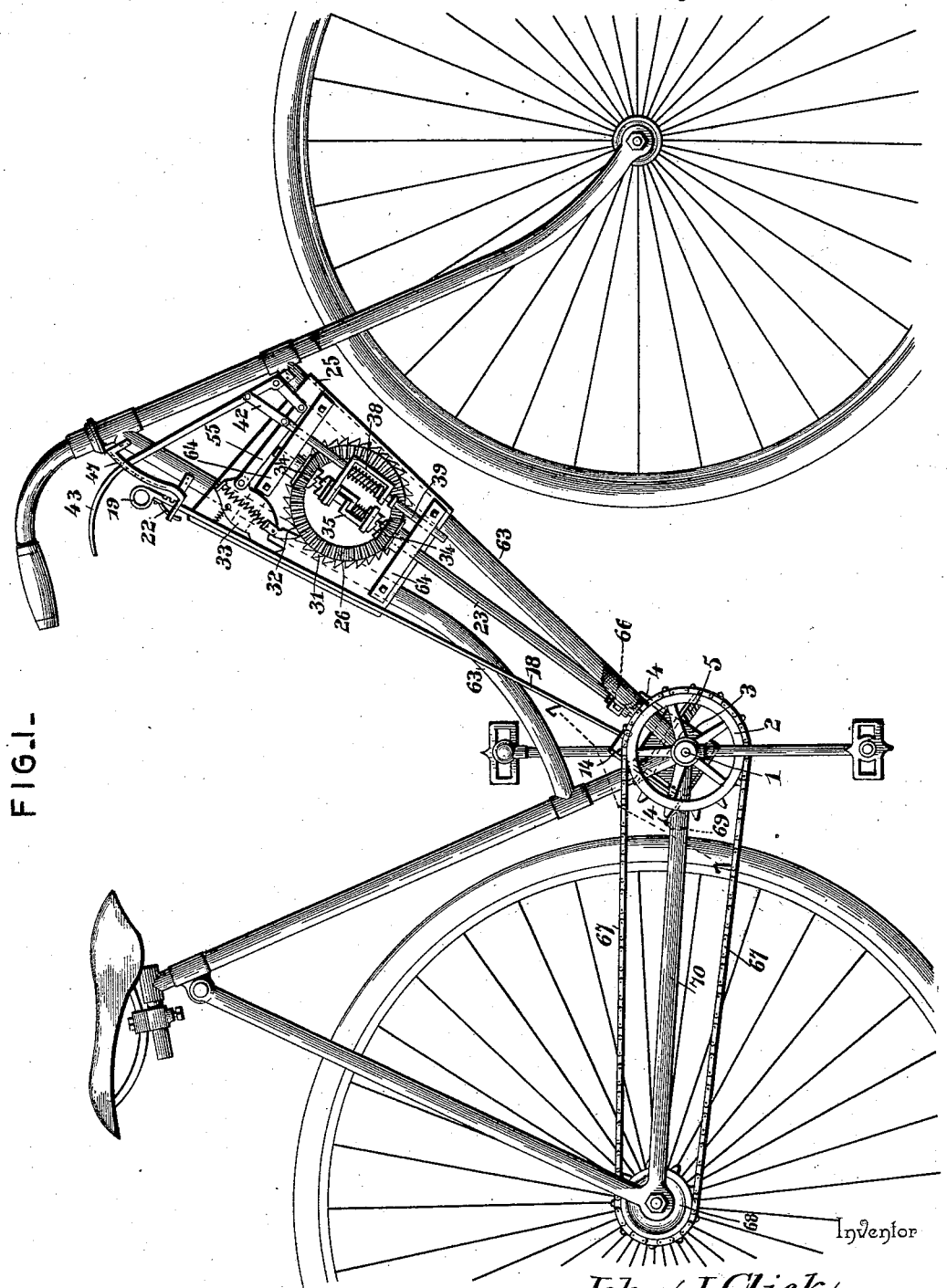

(No Model.)
4 Sheets—Sheet 3.
J. J. CLICK.
REVERSIBLE SPRING MOTOR.
No. 581,103.
Patented Apr. 20, 1897.
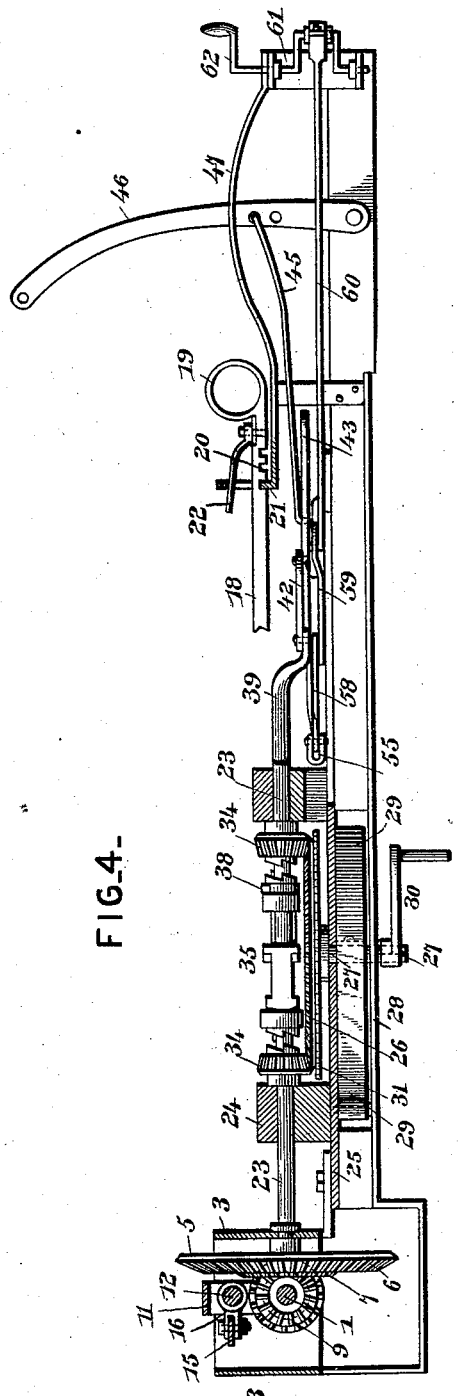
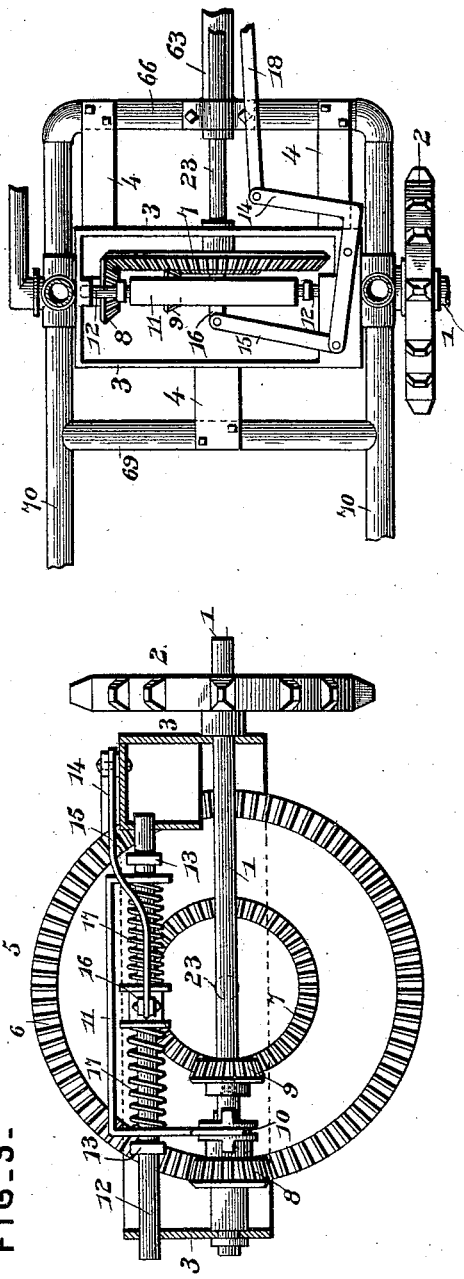
Witnesses
Jas. K. McCathran
R. M. Smith
Inventor
John J. Click
By his Attorneys,
C. A. Snow & Co.

(No Model.) 4 Sheets—Sheet 4.
J. J. CLICK.
REVERSIBLE SPRING MOTOR.
No. 581,103. Patented Apr. 20, 1897.
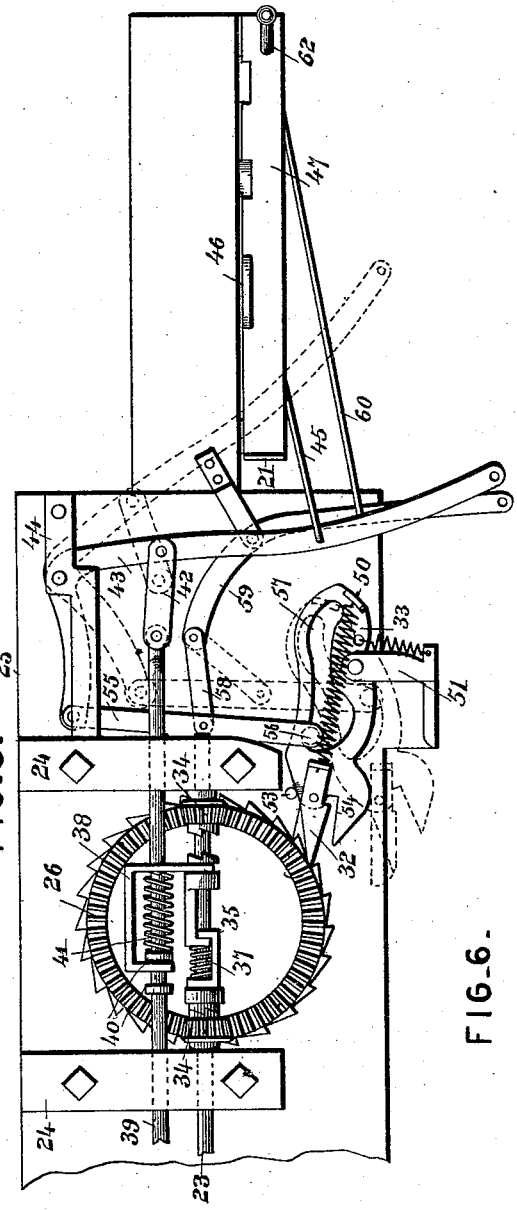
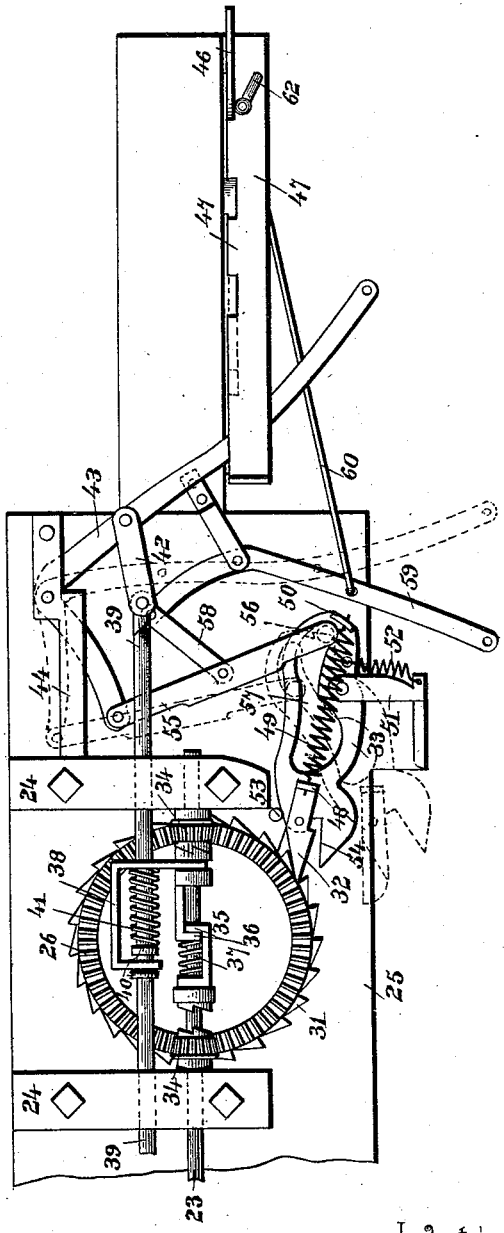
FIG. 5.
FIG. 6.
Witnesses
Jas. K. M͎Cathran
R. M. Smith
Inventor
John J. Click
By his Attorneys,
C. A. Snow & Co.

UNITED STATES PATENT OFFICE.

JOHN JONES CLICK, OF BELLEVUE, TEXAS, ASSIGNOR OF ONE-HALF TO JOHN H. MAJOR, OF SAME PLACE.

REVERSIBLE SPRING-MOTOR.

SPECIFICATION forming part of Letters Patent No. 581,103, dated April 20, 1897.

Application filed May 23, 1896. Serial No. 592,765. (No model.)

*To all whom it may concern:*

Be it known that I, JOHN JONES CLICK, a citizen of the United States, residing at Bellevue, in the county of Clay and State of Texas, have invented a new and useful Reversible Spring-Motor, of which the following is a specification.

This invention relates to spring-motors; and the object in view is to provide an efficient motor of the character described which is particularly designed for use in connection with bicycles, polycycles, and all foot-propelled vehicles, but applicable also to all kinds of vehicles, as well as street and railway cars. The motor may also be applied to sawmill-carriages, log-carriers, &c.

The aim of the invention is to accumulate and store surplus power which is usually lost in stopping vehicles and in holding back the same when descending steep grades, the purpose being to utilize such stored power for the purpose of propelling the vehicle up an incline or at whatever point additional power may be found desirable.

It is the purpose of this invention also to render the mechanism reversible, so that the stored power may be utilized either to propel the vehicle forward or backward.

Other objects and advantages of the invention will appear in the course of the ensuing description.

The objects above enumerated are attained by mechanism embodying certain novel features and details of construction and arrangement of parts, as hereinafter fully described, illustrated in the drawings, and finally incorporated in the claims.

In the accompanying drawings, Figure 1 is a side elevation of a sufficient portion of a bicycle to illustrate the application of the improved motor thereto. Fig. 2 is a general plan view of the mechanism as applicable to any form of wheeled vehicle. Fig. 3 is a transverse section taken about in line with what would be the crank-axle of a bicycle and looking forward. Fig. 4 is a longitudinal section taken about in line with the main driving-shaft. Fig. 5 is a detail plan showing the sway-bar vibrated to one end of the reversing-plate, and showing the position of said plate in full and dotted lines under its two adjustments. Fig. 6 is a similar view with the sway-bar thrown to the other end of the plate. Fig. 7 is a detail plan view of a portion of the machine-frame adjacent to the crank-axle of a bicycle. Fig. 8 is a similar view of the reversing-plate and its pivoted dog. Fig. 9 is a detail perspective view of one member of the double clutch. Fig. 10 is a similar view of the sway-bar.

Similar numerals of reference designate corresponding parts in the several figures of the drawings.

The reversible-power and changeable-speed mechanism embodied in the present invention will first be described generally as applicable to any wheeled vehicle, and the adaptation thereof to a bicycle or other foot-propelled vehicle will be thereafter pointed out. It will be understood that the general framework in which the mechanism is mounted and upon which it is supported may be varied to suit the particular vehicle upon which the mechanism is mounted and that the body or frame of the vehicle may be utilized where convenient to support the several working parts of the mechanism.

Referring now to the accompanying drawings, 1 designates the driven axle, which extends transversely of the vehicle and which has fast thereon, at or near one end, a sprocket-wheel 2, which in case of a bicycle would represent the front or driving sprocket, or said axle may have the ground-wheels of the vehicle secured thereon, or the axle 1 may be geared to the main axle of the vehicle for driving the same. The axle 1 is journaled in a frame 3, mounted on the vehicle and secured in stationary relation thereto by means of suitable arms or brackets 4. Arranged at one side of the axle 1 and preferably in front thereof is a crown or bevel gear 5, having two rows of teeth 6 and 7, with which bevel-pinions 8 and 9, mounted on the axle 1, mesh. These pinions are mounted loosely on the axle 1 and held in place against longitudinal movement on the axle by means of suitable collars, and between these pinions is arranged a sliding clutch 10, having a feather-and-spline connection with the axle and provided with opposing clutch-faces adapted to alternately engage corresponding clutch-faces upon the inner ends of the said bevel-pinions 8 and 9. The clutch and pinions are so arranged that the clutch may be adjusted for locking either one of the pinions to the axle, or said clutch may be adjusted to an intermediate position for leaving both of the pinions idle. The clutch is formed with an annular groove, adapting it to be engaged by a shipping-fork 11, which is mounted upon a slide-bar 12, arranged parallel with the axle 1 and slidingly mounted in the frame 3. The shipping-fork also has a sliding movement on the slide-bar 12, such movement being limited by stops 13 on the slide-bar, and the shipping-fork is operated by means of an elbow-lever 14, fulcrumed at or near its elbow on the frame 3 and connected with the shipping-fork by means of a link 15. This link is pivoted at one end to one arm of the elbow-lever and at its other end to a collar 16, rigid on the slide-bar 12. Between the collar 16 and the opposite ends of the shipping-fork, through which the slide-bar passes, are arranged spiral springs 17, said springs surrounding the slide-bar 12. The object of this arrangement is to permit of a yielding engagement between the clutch 10 and the bevel-pinions 8 and 9, so as to prevent any jamming action between the clutch and pinions and to effect a proper engagement between the same, the shipping-fork being allowed by the springs to yield until one of the clutch-faces thereof is brought into proper engagement with its respective bevel-pinion. Connected to the opposite end of the elbow-lever 14 is a pull-bar 18, which extends forward any desired distance and to any convenient point, where it is provided with a handhold 19 and three notches 20, by which it is adapted to be engaged with a keeper 21, mounted in stationary relation to the body or frame of the vehicle. The bar 18 passes through a slot in the keeper and carries a spring 22, the free end of which bears within the slot in the keeper and serves to retain the notched bar 18 in engagement with the keeper. The notches 20 provide for the three adjustments of the sliding clutch 10 above referred to. It will be understood that the handhold 19 of the bar 18 may be located at any desired point where it will be under the control of the operator.

The main driving-shaft is shown at 23, and it extends longitudinally of the vehicle and at right angles to the driven axle 1, being substantially in the same plane therewith and having the crown or bevel gear 5 fast upon one end. By the mechanism above described it will be seen that this main driving-shaft is capable of being driven by the axle 1 or of driving said axle at two different speeds, the speed being changed by throwing one or the other of the bevel-pinions 8 and 9 into engagement with the driven axle 1. The shaft 23 is journaled in suitable bearings 24 on a bed plate or frame 25 or upon the body or frame of the vehicle and extends diametrically across the face of a crown or bevel gear 26, which constitutes the master-gear of the mechanism. This master-gear is mounted fast upon a short transverse shaft 27, passing through and journaled in the plate 25 and an auxiliary plate or frame-bar 28, parallel with but spaced apart from the plate 25. Between the plates 25 and 28 is arranged a power-storing spring 29, one end of which is attached to a fixed point on the frame and the other end to the shaft 27. But a single spring of spiral form is shown, but it is within the scope of this invention to employ any number of power-storing springs and to arrange them upon the shaft 27 side by side or coiled one within the other, so as to constitute a spring having two or more plies or leaves, the number and strength of the springs depending, of course, upon the size, weight, and other characteristics of the particular vehicle upon which the mechanism is employed. The shaft 27 is also provided with a squared end upon which may be removably fitted a winding-crank 30, adapted to be used in an emergency for winding up the spring or springs. The master-gear 26 is provided with peripheral ratchet-teeth 31, which are engaged by a dog 32, pivotally mounted upon a reversing plate 33, fulcrumed on the bed-plate 25 or on the body or frame of the vehicle. The dog 32 prevents retrograde movement of the master-gear during the winding of the power-springs.

34 indicates a pair of bevel-pinions mounted loosely on the main driving-shaft 23 and gearing with the master-gear at points diametrically opposite. These pinions are provided upon their inner surfaces with clutch-surfaces, by which they are adapted to be alternately engaged by a sliding clutch 35. This clutch has a feather-and-spline connection with the main driving-shaft intermediate the pinions 34, and said clutch comprises two sections each having at its inner end a half-sleeve, the said half-sleeves overlapping each other and being provided with interlocking ears 36, which limit the movement of the two parts of the clutch in opposite directions. A coiled spring 37 surrounds the main driving-shaft and is interposed between the two sections of the clutch for normally holding said sections as far apart as the ears 36 will permit, said spring yielding to allow said sections to move toward each other.

The clutch 35 is operated by means of a shipping-fork 38, which engages one of the clutch-sections, and the shipping-fork is itself operated by means of a slide bar or rod 39, arranged parallel with the main driving-shaft and sliding through the bearings 24. The shipping-fork 38 also has a sliding movement upon the slide-bar 39, one end of the fork through which said bar passes being confined between spaced collars or stops 40 thereon. A coiled spring 41 surrounds the slide-bar 39 and is interposed between the shipping-fork and a collar or stop, such spring serving to press one of the clutch-sections into engagement with its respective pinion when the slide-bar is moved in one direction, while the other spring 37 acts in a like capacity in connection with the other section of the clutch. This yielding of the clutch-sections is provided for the purpose of preventing jamming and binding between the clutches and pinions and to effect the proper engagement between such parts.

By means of the construction just described it will be seen that either of the pinions 34 may be locked to the main driving-shaft and that when one of the pinions is so locked the shaft will be revolved in one direction and when the other pinion is locked to the shaft and the former pinion released the shaft 23 will be revolved in the opposite direction. By adjusting the clutch to an intermediate position the shaft 23 will be free to revolve without influencing or being influenced by the master-gear and the power-springs.

The forward end of the slide-bar 39 is connected by means of a link 42 with a shifting-lever 43, of elbow form, and fulcrumed at its elbow between a bracket 44 and the plate 25 or the body or frame of the vehicle. From the lever 43 a link 45 extends to another shifting-lever 46, fulcrumed on the body or frame of the vehicle and engaging a segmental rack 47, also secured to the body or frame of the vehicle in any convenient manner and provided with three notches, with which the shifting-lever may engage for moving and holding the clutch 35 in any one of its three adjustments hereinabove described.

The reversing-plate 33 is of oblong form and is fulcrumed intermediate its ends on the plate 25 or frame or body of the vehicle. The dog 32 is pivotally connected to one end of the plates 33, adjacent to the master-gear, and said dog is provided at its rear end with a perforated ear 48, to which one end of a coiled spring 49 is connected, the other end of said spring being connected to an ear 50 at the opposite end of the plate 33 for holding the dog in proper position to engage the ratchet-teeth on the master-gear, said spring also allowing the dog to yield inward while being withdrawn from engagement with the ratchet-teeth.

The plate 33 is preferably fulcrumed in a bracket 51 on the plate 25, and a coiled spring 52 is interposed between an ear or extension on said bracket and the plate 33, the tension of said spring being exerted to hold the rear end of the plate 33 toward the master-gear for keeping the dog 32 in engagement therewith. The inward movement of the plate 33 is limited by a stop 53, and the outward vibration of the dog 32 is arrested by a stop or extension 54 on the plate 33. The reversing-plate 33 is operated by means of a sway-bar 55, one end of which is pivotally connected to the short arm of the elbow-lever 43. This sway-bar is bifurcated or formed with parallel arms, by which it is adapted to embrace the plate 33, and these arms are connected by means of a transverse pin 56, which works in a slot 57 in the plate 33. This slot extends longitudinally of the plate, and the end portions of the slot are enlarged for the purpose of admitting of a certain amount of movement of the sway-bar and its pin 56 without affecting or moving the plate 33. The sway-bar 55 is connected by means of a link 58 with a reversing-lever 59, fulcrumed intermediate its ends on the plate 25 or body or frame of the vehicle, and from said lever a link or rod 60 extends forward to and connects with a crank-shaft 61, mounted in bearings on the frame or body of the vehicle and having an operating crank-arm 62. By this arrangement as the crank-arm 62 is vibrated toward the rear the pin 56 of the sway-bar will be thrown to the forward end of the plate 33. By moving said crank-arm forward the pin 56 is carried toward the rear of the plate 33. This adjustment of the sway-bar and its pin 56 is effected while the shifting-lever 46 is in the middle notch of the segment 47. By moving said shifting-lever in one direction one of the pinions 34 will be coupled to the main driving-shaft 23, the enlarged end of the slot 57 in the plate 33 permitting the pin 56 to move therein without throwing the dog 32 out of engagement with the master-gear. While the parts are in this position the movement of the vehicle will operate the driving-shaft 23, which, being in mesh with the master-gear, will effect a winding up of the power-springs. By moving the shifting-lever 46 to the other end of its throw the plate 33 will be acted upon by the pin 56 and vibrated in such manner as to throw the dog 32 away from the master-gear. This will allow the master-gear to rotate, and, the opposite pinion 34 having been locked to the driving-shaft by the same adjustment of the shifting-lever 46, the master-gear will operate by the power of the springs to rotate the driving-shaft 23 in the same direction it was turned for winding up the springs, so that said shaft will drive the vehicle in the same direction in which it was moving during the winding of the springs.

The operation is as follows: Supposing the vehicle to be moving forward, when it is desired to apply the brakes or to hold back the vehicle in descending an incline the shifting-lever 46 is thrown into engagement with the forward notch in the segment 47, while the pin 56 is in the forward end of the slot 57. Under this adjustment the forward pinion 34 is locked to the driving-shaft 23, and upon the forward rotation of the wheels of the vehicle the said shaft will rotate the master-gear and wind up the spring or springs 29, thus storing the power therein which would otherwise be wasted. Having come to a standstill or having reached the bottom of the incline, the lever 46 may be adjusted to the central notch of the segment, which will throw the driving-shaft 23 and master-gear out of engagement, the dog 32 engaging the master-gear for preventing the unwinding of the springs. When it is desired to use the stored power, the lever 46 is moved into the rear notch of the segment 47, and this movement vibrates the plate 33 and withdraws the dog 32 from engagement with the master-gear, thus leaving said gear free to be driven by the power-springs, and the rear pinion 34 having been locked to the shaft 23 as the master-gear rotates the said shaft will be actuated in a direction which will drive the wheels of the vehicle forward, so that the power is utilized to propel the vehicle in the same direction in which it is moving during the storing of the power. The backward movement of the vehicle may be utilized for storing the power in the springs in a similar manner, the only difference in the adjustment of parts being that the crank-arm 62 is vibrated forward, so as to throw the pin 56 to the rear end of the slot 57. This is done while the lever 46 is in the middle notch. The lever 46 is now moved to the rear notch, whereupon the backing of the vehicle will effect a winding-up of the springs through the engagement of the driving-shaft with the master-gear, the rear pinion 34 being now in engagement with such master-gear and the forward pinion idle. When the vehicle has reached the limit of its backward movement, the lever 46 may be moved into the middle notch for disengaging the shaft 23 and master-gear. When it is desired to utilize the power thus stored, the lever 46 is vibrated into the forward notch, which throws the forward pinion 34 into engagement with the shaft 23 and at the same time withdraws the dog 32 from engagement with the master-gear. This allows the spring to act, and the master-gear drives the shaft 23 in a direction which will propel the vehicle backward or in the same direction it was moving during the storage of the power. It is also possible to utilize the power stored while the vehicle is moving in one direction for propelling the vehicle in the reverse direction. Suppose, for instance, that the vehicle is moving forward. The pin 56 is moved by means of the crank-arm 62 to the front end of the slot 57, and the shifting-lever 46 is moved into the front notch of the segment 47. Under this adjustment the forward movement of the vehicle will wind up the springs. After the power has been stored the lever 46 is moved to the middle notch, after which the crank-arm 62 is vibrated for throwing the pin 56 to the rear end of the slot 57. By now moving the lever 46 again to the front notch the forward pinion 34 is locked to the driving-shaft 23 and the dog 32 is thrown out, which releases the master-gear, and said gear, actuated by the power-springs, drives the shaft 23 and propels the axle 1 backward, thus backing the vehicle.

From the foregoing description it will be seen that the power ordinarily lost in applying brakes and in descending inclines is capable of being stored in one or more springs mounted upon the vehicle and that said power may be utilized, when desired, either for propelling the vehicle forward or assisting in the propulsion of the vehicle up an incline or for backing the vehicle. It will also be seen that after the power has been stored the storing mechanism may be thrown out of gear with the axle and wheels of the vehicle for allowing the latter to run perfectly free, just as if the mechanism were not applied to the vehicle. Subsequently and at any desired time the stored power may be thrown into engagement with such axle and wheels for propelling the vehicle either forward or backward.

The adaptation of the mechanism hereinabove described to a bicycle is accompanied by an omission of a number of parts which are thereby rendered unnecessary. The lever 46, the rod 45, the crank-arm 62 and crank-shaft, and the rod 60, and also the reversing-lever 59 and link 58, together with the slot 57, are dispensed with and the sway-bar 55 is connected pivotally to the plate 33, preferably at or near its forward end. It not being practicable to propel a bicycle backward, the reversing mechanism may thus readily be dispensed with, as it can only be desired to utilize the stored power for propelling the machine forward. The mechanism is shown applied to an ordinary drop-frame safety having the duplex reach-bars 63. For the application of the mechanism above described these reach-bars 63 are connected by transverse bars 64, arranged in opposing pairs upon opposite sides of the bars 63 and spaced apart longitudinally, the said bars 64 forming bearings for the longitudinal driving-shaft 23 and the slide rod or bar 39 carrying the shifting-fork 38. The shifting-lever 43 is arranged near the head of the machine and its handle end is arranged in proximity to the handle-bar of the machine, while its elbow is fulcrumed near the lower end of the head-tube, where the lower reach-bar 63 connects therewith. Additional supporting bars or plates are provided, the same being connected either to the machine frame-bars 63 or to the transverse bars 64 and serving to support the bearings for the transverse shaft 27 of the master-gear and power-springs. The rear end of the driving-shaft 23 is mounted in bearings in a cross-bar 66, arranged in front of the crank-axle, the said crank-axle corresponding to the driven axle 1, hereinbefore described, and carrying the sprocket-wheel 2, from which the drive-chain 67 extends to the rear sprocket 68 on the driving-wheel of the machine. Another cross-bar 69 is arranged in rear of the crank-axle and connects the rear fork members 70 in advance of the driving-wheel. Within the frame thus formed, adjacent to the crank-axle, is mounted the crank-axle, the bevel-gear 5, the pinions 8 and 9 for affording the changeable speed, the shifting-clutch 10, and the shifting-fork, elbow-lever, &c., and from the elbow-lever the operating bar or rod 18 extends forward and upward, where it engages with its keeper 19, arranged near the head of the machine.

The rider, instead of employing an ordinary brake, may throw the power-storing mechanism into operation by means of the lever 43 and thus accumulate and store the power which would otherwise be wasted in descending hills or in bringing the machine to a stop. At any subsequent time, while ascending a steep incline, he may utilize this stored power which will materially assist him when used in connection with the pedals. As stated, no provision is made in mounting the mechanism upon a bicycle for reversing the application of the power, so as to propel the machine backward, but in tricycles, polycycles, and other foot-propelled vehicles the reversing mechanism hereinabove described may be used to advantage. It is intended to provide suitable casings for inclosing the working parts of the mechanism in order to exclude dust, dirt, and moisture therefrom, but these are not shown, as they would interfere with the illustration of such mechanism. It is obvious that the mechanism is susceptible of many changes in the form, proportion, and minor details of construction, which may accordingly be resorted to without departing from the spirit or sacrificing any of the advantages of this invention.

Having thus described the invention, what is claimed as new is—

1. In a mechanical motor, the combination with the master-gear, and the power-spring connected thereto, of the driving-shaft extending across the face of the master-gear, the pinions mounted loosely on said shaft and in constant mesh with said gear, a sliding clutch on the driving-shaft located intermediate said pinions and adapted to be moved alternately into engagement with the same, a shifting fork for said clutch, a slide-bar for operating the shifting fork, and a spring bearing against said fork for allowing the same to slide upon the slide-bar and yield relatively to the pinion with which it engages, substantially as and for the purpose described.

2. In a mechanical motor, the combination with the master-gear, and the power-spring operatively connected thereto, of the driving-shaft, the pinions mounted loosely thereon and meshing with said gear, a clutch having a feather-and-spline connection with the shaft and interposed between the pinions, and means for shifting said clutch, the clutch being made in sections which have a yielding relation to each other, substantially as described.

3. In a mechanical motor, the combination with the master-gear and the power-spring, of the driving-shaft, the loose pinions thereon, a sliding clutch on the shaft intermediate the pinion, and means for shifting said clutch, the clutch consisting of two independently-movable sections having an interposed spring which normally forces the said pinions apart but allows them to yield toward each other, substantially as described.

4. In a mechanical motor, the combination with the master-gear and the power-spring, of the driving-shaft, the loose pinions thereon meshing with the gear, the sliding clutch on the shaft intermediate the pinions, and means for shifting the clutch, said clutch comprising two independently-movable sections having overlapping portions and interlocking ears for limiting their relative movement, and a spring interposed between said sections, substantially as and for the purpose described.

5. In a mechanical motor, the combination with the driving-shaft and means for actuating the same, of a gear-wheel fast on said shaft, the driven axle, pinions mounted loosely on said axle and both meshing constantly with said gear, a clutch located intermediate said pinions and movable relatively thereto, a shifting fork for said clutch, a slide-bar for moving the shifting fork, and a spring for allowing the fork to yield relatively to the slide-bar, substantially as and for the purpose described.

6. In a mechanical motor, the combination with the driving-shaft and actuating means therefor, of a bevel gear-wheel fast on said shaft and having two concentric sets of teeth, independent pinions mounted loosely on the driven axle and in constant mesh with said bevel-gear, a clutch arranged between said pinions and movable relatively thereto, so as to interlock with one or the other and clutch the same to the axle, a shifting fork for said clutch, a slide-bar for moving the shifting clutch, a stationary collar on the slide-bar, means connected with said collar for moving the slide-bar, and a spring interposed between said collar and the shifting fork whereby the latter is adapted to yield longitudinally of the slide-bar, substantially as and for the purpose described.

7. In a mechanical motor, the combination with the master-gear and the power-spring, of the driving-shaft, the loose pinions thereon, the clutch for engaging said pinions with the driving-shaft, a lever for shifting said clutch, a sway-bar connected to said lever, and a pivoted plate operatively connected to said sway-bar and carrying a dog which engages the master-gear, substantially as and for the purpose described.

8. In a mechanical motor, the combination with the master-gear and driving-shaft, of the loose pinions on said shaft meshing with the gear, the clutch for locking one or the other of said pinions to the shaft, a shifting-lever for operating the clutch, a sway-bar operatively connected to said shifting lever, and a pivoted plate carrying a dog for engaging the master-gear, said plate being slotted to receive the end of the sway-bar, substantially as and for the purpose described.

9. The combination with the master-gear and the driving-shaft, of the pinions for reversing the direction of said shaft, the clutch for engaging said pinions, a shifting-lever for moving the clutch, the sway-bar operatively connected to said shifting lever, the pivoted plate carrying the dog for engaging the master-gear and slotted to receive the end of the sway-bar, and an operating-lever for moving said sway-bar independently of the shifting lever for changing the end of the sway-bar from one end of the said slot to the other, substantially as and for the purpose described.

10. In a mechanical motor, the combination with the master-gear, of a pivoted plate fulcrumed intermediate its ends, a dog at one end of said plate mounted in movable relation to the plate and engaging the master-gear, means for controlling the position of said dog, and a spring for preserving the engagement between the dog and the master-gear, substantially as described.

11. In a mechanical motor, the combination with the master-gear, of a pivoted plate fulcrumed intermediate its ends, a dog pivotally mounted on one end of said plate and engaging the master-gear, a spring connected to said dog for allowing the same to yield, and a second spring interposed between said pivoted plate and a fixed point for actuating that end of the plate upon which the dog is arranged toward the master-gear, substantially as described.

12. The combination with the frame of a foot-propelled vehicle, and the crank-axle mounted therein, of a mechanical motor mounted on the frame of the machine, a gear-wheel fast upon the main driving-shaft of the motor, reversing mechanism for changing the direction of rotation of the main driving-shaft, the pinions mounted loosely on the crank-axle and in constant mesh with said gear-wheel, the sliding clutch interposed between and movable relatively to said pinions, and a pull-bar operatively connected to said clutch and extending within reach of the rider for shifting said clutch and engaging one or the other of said pinions with the crank-axle, substantially as described.

In testimony that I claim the foregoing as my own I have hereto affixed my signature in the presence of two witnesses.

JOHN JONES CLICK.

Witnesses:
MILTON JAMES WHITE,
ROM. HICKEY.